July 28, 1970  J. C. WALTERS  3,521,762
BALE STACKING APPARATUS
Filed March 13, 1968  6 Sheets-Sheet 1

INVENTOR
JAMES C. WALTERS
BY
*Sheridan and Ross*
ATTORNEYS

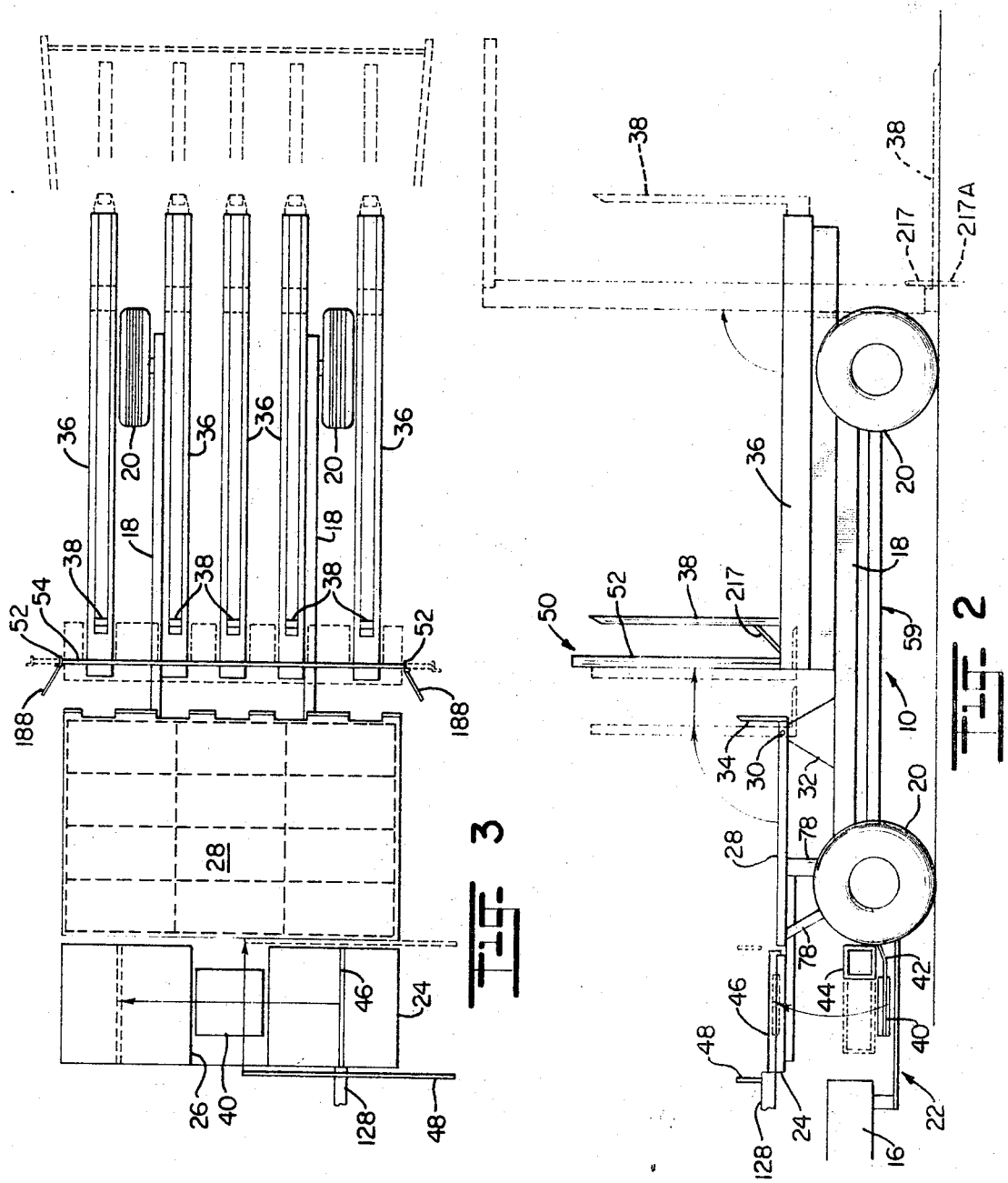

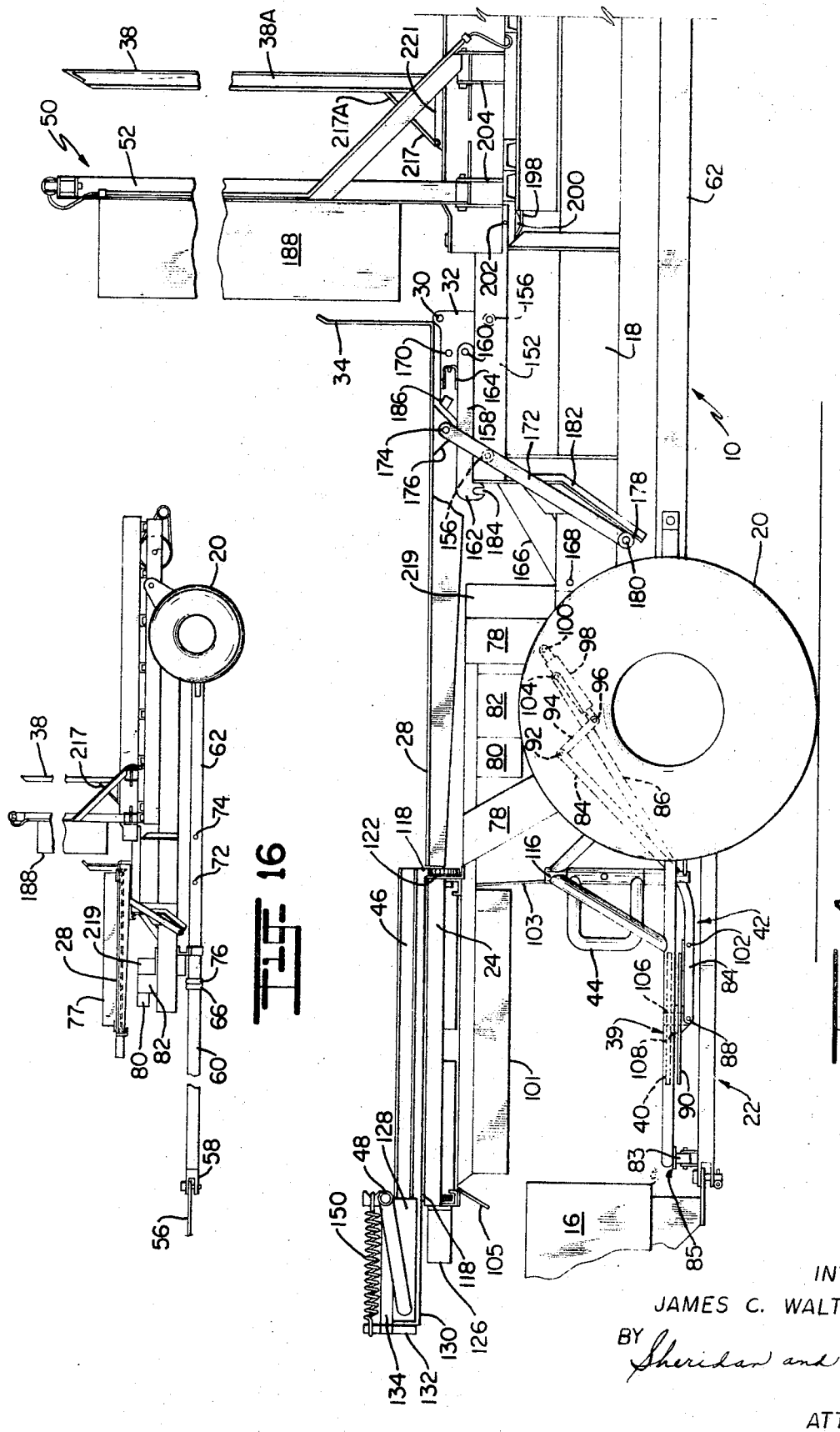

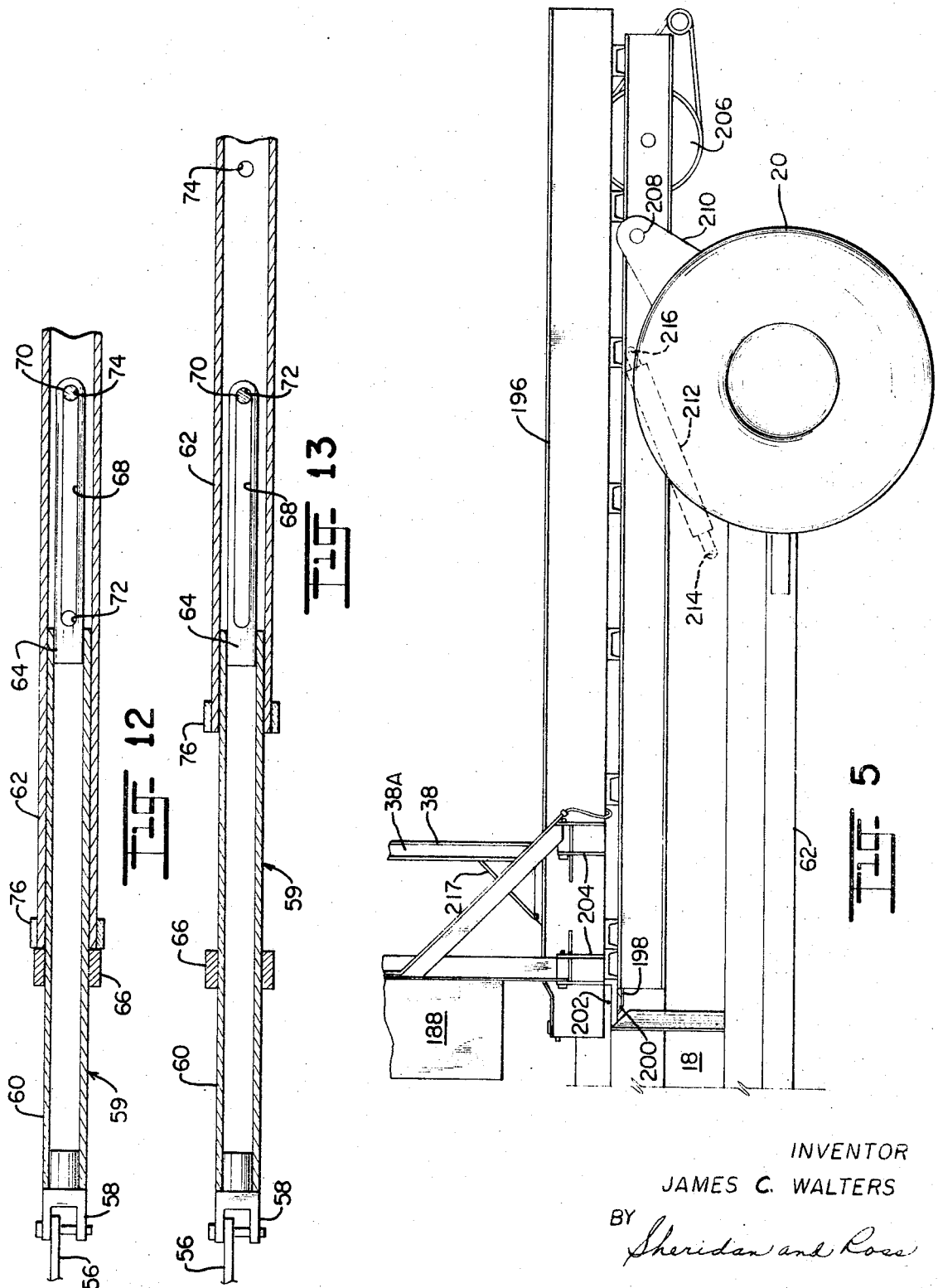

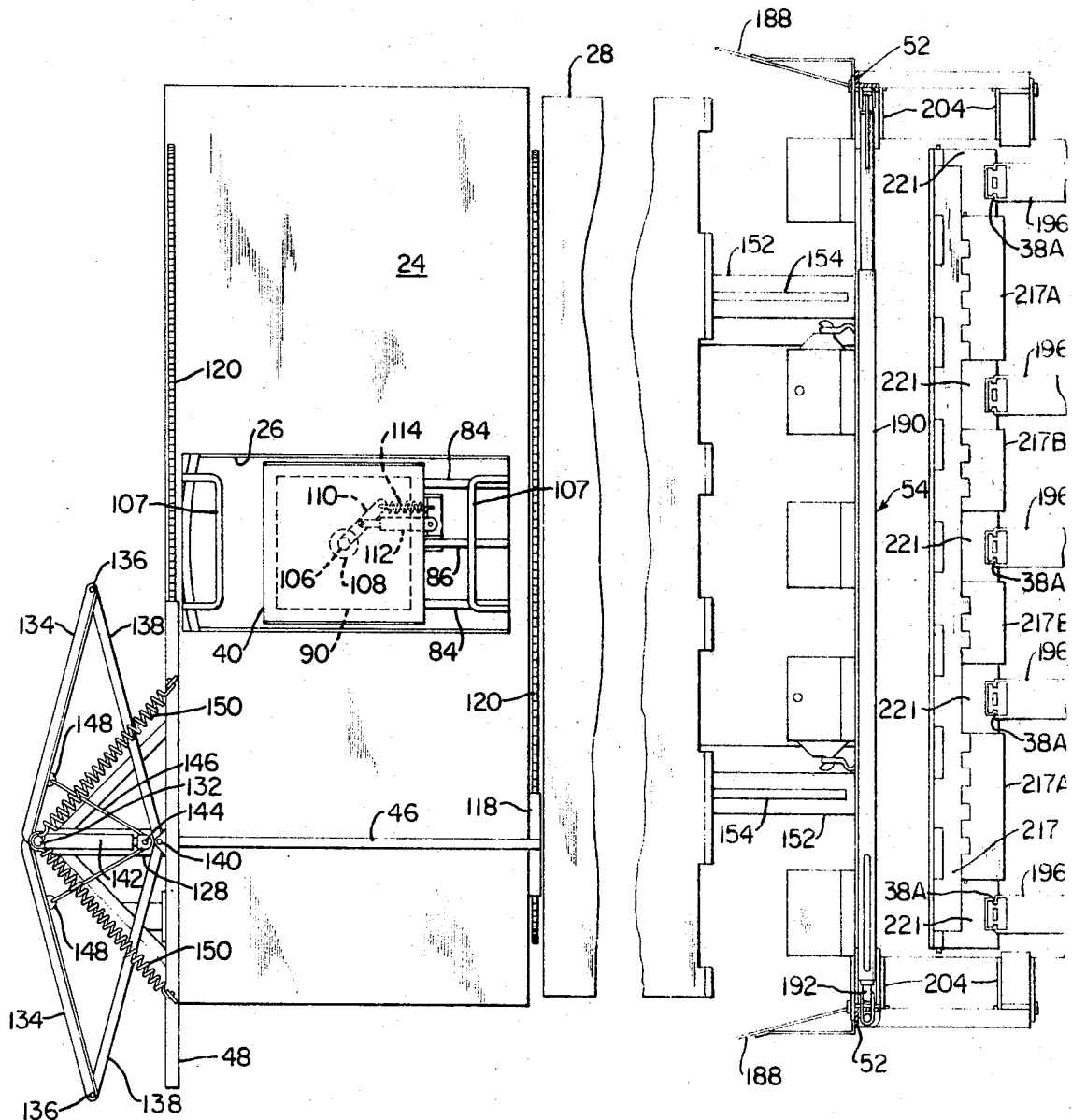

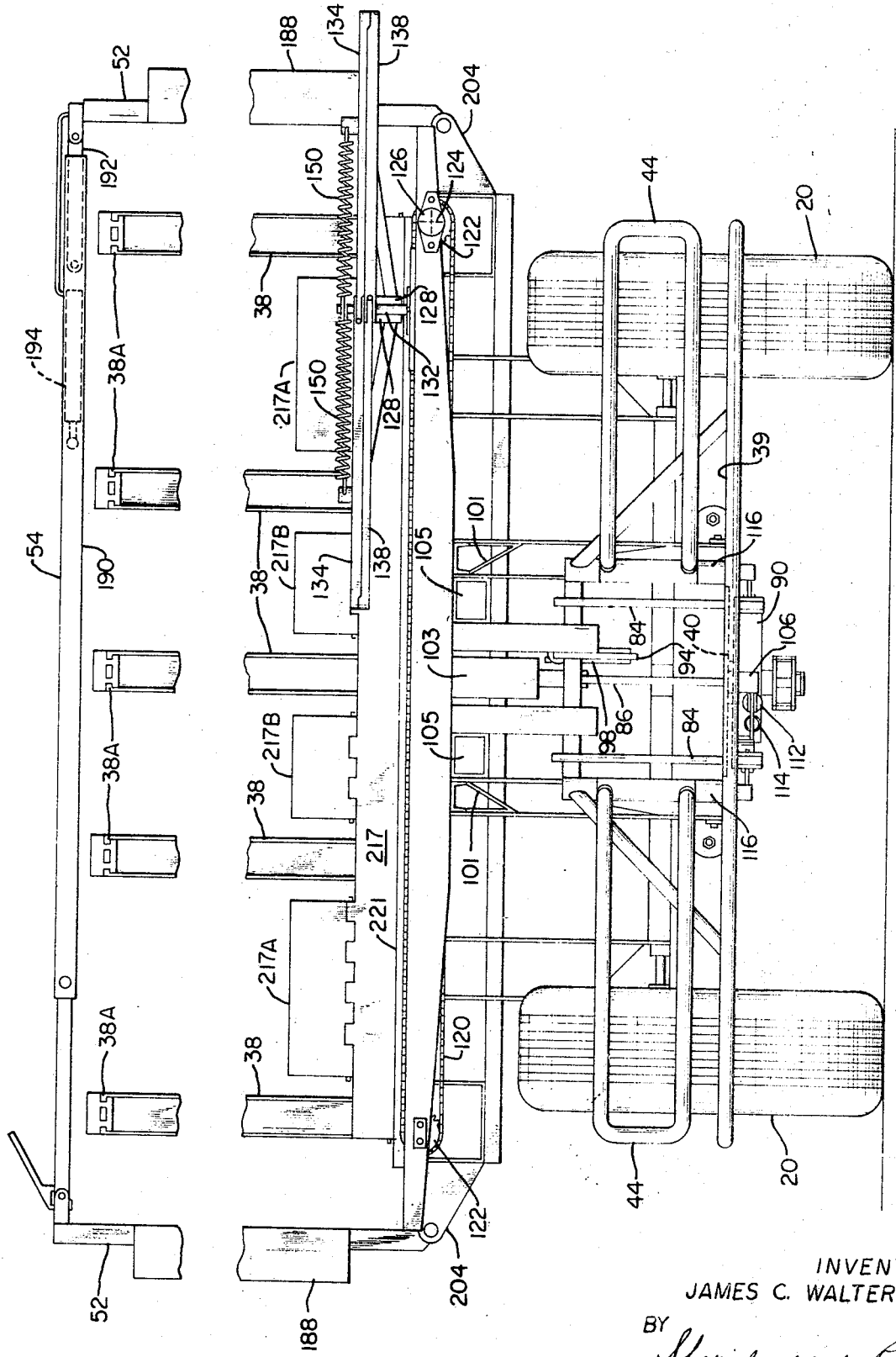

United States Patent Office 3,521,762
Patented July 28, 1970

---

3,521,762
BALE STACKING APPARATUS
James C. Walters, 2326 Lowell Blvd.,
Denver, Colo. 80211
Filed Mar. 13, 1968, Ser. No. 712,664
Int. Cl. B60p 1/28, 1/16
U.S. Cl. 214—6      7 Claims

ABSTRACT OF THE DISCLOSURE

Apparatus to produce butt or stack of bales with bale axes in each layer oriented to achieve best total intertie. Table on trailer receives successive bales from baler, raises each bale to level of positioning bed, and is rotatable about vertical axis to align each bale fore and aft or laterally as desired. First fences moves bale laterally to desired position. Second fence moves rearwardly to push bale onto transfer bed. Loaded transfer bed swings up to deposit the layer on the load bed. Clamp bars are used to compact the bales within each layer. When full stack is completed, load bed titlts to deposit stack upright on ground.

BACKGROUND OF THE INVENTION

This invention lies in the field of apparatus which collects individual uniform size bales of materials such as hay or other fodder, arranges the bales in single thickness layers, builds successive layers into stacks, and deposits the stacks on the ground in upright attitude. It is directed more particularly to such an apparatus which is capable of arranging the bales in each layer in any desired orientation pattern in order to achieve the best intertie between the bales of successive layers in a stack and thus prevent separation or toppling of an erected stack.

For various reasons, it is desirable to store hay and the like in the form of stacks which are about eight to ten bales high. If the planform of these stacks is only four to six bale widths on a side, each stack is a somewhat slender column. Although the material is tightly baled and is quite resilient in character, the total column is not comparable in rigidity to a similar column of bricks or lumber. This difficulty is overcome as well as possible by overlapping portions of the bales in one layer with portions of the bales in the adjacent layer so that the tendency of any one bale to shift is resisted by its frictional engagement with portions of one or more other bales.

A common bale is 14" high by 18" wide and is about three feet long. Thus a maximum effective overlap would be an eighteen inch square common to bales in successive layers. A typical small field pattern is about six feet by nine feet, with twelve bales in each layer. The common practice is to make a first layer with all bales oriented the long way and a second layer with all bales oriented laterally, and to alternate such layers in the stack. In this arrangement every bale is overlapped by two other bales to form the intertie mentioned above but the net result is a stack with six individual columns, quite high and only three feet square with no intertie between the columns. It is obvious that such an array is highly unstable.

The only mechanical stackers known to date are of such nature that they cannot produce stacks of any kind other than those mentioned above. One such machine is so designed that several bales are delivered sequentially to a platform at the front end of the machine with the bale axes extending laterally of the machine. The row of bales is then pushed rearwardly onto a transfer bed. Successive rows are formed and pushed back until the transfer bed is filled, and it is then actuated to move the layer to a load bed. The machine is then stopped and rearranged to deliver successive rows to the platform with the bale axes extending longitudinally of the machine, from which they are moved to the transfer bed. This changeover operation must be repeated for each successive layer.

Another machine has a similar platform for receiving and transferring rows of bales, but does not have the changeover mechanism. Instead, when each alternate layer is completed, the entire transfer bed must be rotated ninety degrees about a vertical axis to change the direction of the bale axes a similar amount, before moving the layer to the load bed.

An ideal solution to the intertie problem is to arrange the bales in each successive layer in accordance with a predetermined pattern in which some bales extend longitudinally and some laterally, and they are so located that interties extend throughout the entire planform. This has been done by individual manual handling of each bale to arrange it in its proper place in the layer but no machine has been available which will do this mechanically.

SUMMARY OF THE INVENTION

The present invention provides a complete solution to the problems pointed out above with a comparatively simple and highly reliable mechanism which handles each bale individually to orient it and move it to the proper station in any predetermined pattern.

Generally stated, the apparatus comprises an elongate wheeled frame, or trailer, with a tow bar at its forward end so that it may be attached directly to and towed by a baler which in turn is towed by a tractor. At the forward end of the frame, at an elevated position, is mounted a positioning bed which is preferably rectangular with its major axis extending laterally of the frame axis. Directly behind the positioning bed is a transfer bed to receive properly oriented bales and build up a layer. The transfer bed is pivotally mounted at its rear edge to swing upright and deliver a layer to the load bed which is mounted behind it on the frame.

In the presently preferred form, the positioning bed is provided with a large central opening. The frame further carries a receiving table mounted on an elevator. The table has a lower position directly behind the bale chute where it receives a bale in longitudinal attitude. It then rises through the opening to present the bale above the upper surface of the positioning bed. If, according to the predetermined pattern, the bale is to extend longitudinally in the layer it is ready to be transferred. If it is to extend laterally in the layer, a servomotor rotates the table ninety degrees about a vertical axis.

A longitudinally extending fence on the bed now moves laterally to engage the bale and move it bodily to its proper lateral position in the pattern. Then a laterally extending fence on the bed moves longitudinally to engage the bale and move it bodily onto the transfer bed. In the meantime, the table has been lowered into position to receive the next bale. Each bale is successively moved in accordance with the pattern and as one row is filled the next bales move the preceding ones farther back on the transfer bed until the layer is completed.

The transfer bed swings to upright position, moves to the rear, deposits the layer on the load bed, and returns to its original position. The next layer of bales is now arranged on the transfer bed in accordance with a second pattern and delivered to the load bed into contact with the first layer. This is repeated with the third and fourth layers with their individual patterns to produce a network of interties throughout the planform of the stack. Four alternate patterns are used for successive layers to tie the entire stack into an entity. Thus, the apparatus of this invention reduces the amount of labor heretofore required; permits varying the size of the layer to meet individual loading circumstances; and minimizes rain damage.

BRIEF DESCRIPTION OF THE DRAWINGS

Various other advantages and features of novelty will become apparent as the description proceeds in conjunction with the accompanying drawings, in which:

FIG. 2 is a schematic side elevational view of the apparatus;

FIG. 3 is a schematic plan view of the apparatus;

FIG. 4 is a detailed side elevational view of the forward portion of the apparatus;

FIG. 5 is a detailed side elevational view of the rearward portion of the apparatus;

FIG. 6 is a detailed plan view of the forward portion of the apparatus;

FIG. 7 is a detailed front elevational view of the apparatus;

FIGS. 12 and 13 are sectional views of the telescoping tow bar in contracted and extended position;

FIG. 16 is a schematic elevational view of the apparatus modified to rehandle stacks of bales.

DESCRIPTION OF THE PREFERRED EMBODIMENTS

Figure 1:
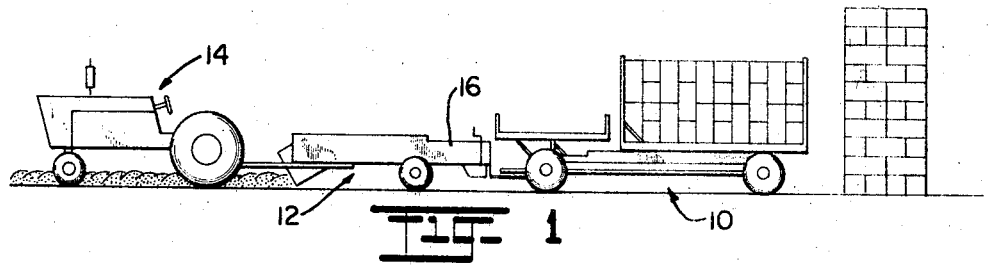
FIG. 1 is a schematic side elevational view of the novel apparatus entrained with a tractor and baler.
Figure 8:
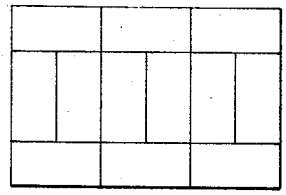
FIGS. 8, 9, 10 and 11 are schematic plan views of special stack patterns.
Figure 9:
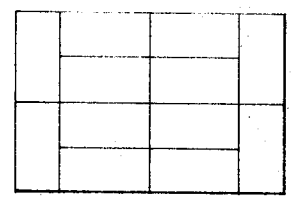
Figure 10:
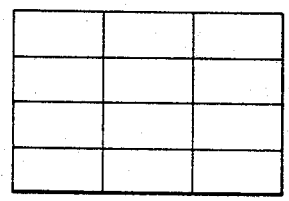
Figure 11:
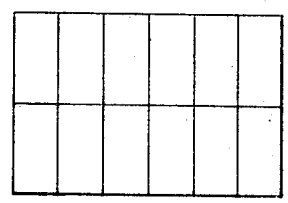

The manner of use of the apparatus is illustrated in FIG. 1, in which a stacking machine 10 is connected to a baler 12 which in turn is connected to a tractor 14 which tows the two vehicles along a lone of mown hay or other fodder. The baler gathers the fodder, bales it, and delivers it through a chute, or bale delivery device 16 to the stacking machine. The latter builds up stacks and deposits them on the ground in upright attitude.

The principal parts of the apparatus, their relation to each other, and their operation are schematically shown in FIGS. 2 and 3. The elongate frame 18 is provided with ground wheels 20 to form a trailer having a tow bar 22 connected to the baler drawbar to be drawn along a field. A positioning bed 24 is mounted at an elevated position at the forward end of the frame. It is rectangular in planform with its major axis extending laterally of the longitudinal axis of the frame and is provided with a central vertically extending opening 26.

Rearwardly adjacent to bed 24 is transfer bed 28 which is also rectangular in shape with its forward edge parallel and adjacent to the rear edge of bed 24. Bed 28 is pivotally mounted along a horizontal lateral axis 30 adjacent its rear edge to carriage means 32 which is slidably mounted on the frame for longitudinal movement. Flange 34 extends upwardly from the rear edge of bed 28 to support a layer of bales on edge when the bed is raised to upright position.

Load bed 36 is spaced rearwardly from the transfer bed and is pivotally mounted on the frame to swing to an upright position as shown in dotted lines to deposit a completed butt on the ground. A load fork in the form of tines 38 is mounted on the load bed for movement fore and aft to receive a butt and to support it during the unloading operation.

A bale receiving frame 39 is located directly below and behind baler chute 16. A bale receiving table 40 is located at the forward end of the frame 18 and is mounted on elevator 42 to move vertically between a lower level slightly below the receiving frame 39 and an upper level slightly above that of bed 24. In its lower position it is centered between sweep arms 44 and receives bales therefrom in a fore and aft attitude. During a turn in the field the baler will deposit a bale on the receiving frame 39 in a misaligned attitude, and sweep arms 44 move in from each side to correct the alignment and then return to their original position. The elevator then moves the table and bale to its upper position. If the predetermined pattern calls for the bale to be aligned longitudinally, it is ready to be transferred. If it is to be aligned laterally, the table is rotated ninety degrees about a central vertical axis. The elevator then lowers to its original position, depositing the bale on the positioning bed.

When the bale is properly oriented at the upper level, longitudinally extending positioning fence 46 moves laterally to engage the bale and push it to the desired lateral position. If a particular bale is to be centrally located, of course fence 46 does not operate. Laterally extending loading fence 48 now moves longitudinally rearwardly to push the bale onto the forward portion of the transfer bed 28, and then returns to its original position. As the loading fence 48 returns to its original position, the positioning fence 46 is repositioned to a predetermined point either to the left or right of the positioning bed opening 26. It will then always be on the correct side of the next arriving bale to be able to push it in the proper direction.

Each successive bale is received by receiving frame 39, picked up by table 40, delivered to bed 24, and moved to bed 28 to form a first or rear row of bales. As the second row is formed, the new bales push the first bales rearwardly. The third and fourth rows are formed in the same way and pushed onto the transfer bed to complete the layer, as indicated in dotted lines.

Transfer bed 28 is now tilted to upright position and flange 34 supports the layer as the bed moves rearward on carriage 32 until the layer contacts fork 38 and is supported on load bed 36. The fork moves to the rear as each successive layer is loaded and allows the new layer to shove all previous layers to the rear. The transfer bed then returns to its forward position and swings back down to horizontal. A support frame 50 is provided at the forward end of the load bed and includes a pair of upright clamp bars 52, one at each side of the bed, and contracting means 54 extending between their upper ends. As each layer is delivered to the load bed, it enters between the clamp bars which are then contracted near the forward edge of the layer to compact the layer laterally and grip it tightly to prevent it from toppling in any direction.

It was indicated in FIG. 1 that when a stack is completed it is deposited in the field. It then becomes desirable to pick up these stacks and transfer them to a central storage location. Ordinarily, it is not difficult to pull fork 38 out from under a stack which has been unloaded. However, once the bales have settled on the ground, a great deal of force is required to reinsert the fork for the purpose of reloading. To assist in the reloading operation, it is necessary to convert the two-axle trailer to a single axle trailer since the two-axle trailer cannot be maneuvered or backed up as is the case with the single axle trailer. The conversion is accomplished by removing the front wheels 20 of trailer 10, the tow bar 22, the positioning bed 24, the elevator 42, sweep arms 44, the positioning fence 46, the loading fence 48, the receiving table 40, the receiving frame 39, and the super structure 78. In FIG. 16 is shown the trailer which has been converted from a two-axle trailer to a single axle trailer as described above. The forward portion of the trailer shown in FIG. 16 includes the telescoping sections illustrated in FIGS. 12 and 13. In FIGS. 12, 13 and 16, the reloading tow bar 59 is shown formed in telescoping sections. The bar 59 generally comprises a tongue 60 slidable within trailer reach 62, the tongue being provided with an extension bar 64 and a hammer ring 66. To provide limited sliding action, the bar 64 is formed with an elongate slot 68 adapted to accommodate slidingly in linchpin 70 which passes laterally through reach 62 by way of holes or openings 72 or 74. The reach is also provided as its free end with an anvil ring 76. In FIG. 12, the hammer ring 66 is in contact with the anvil ring 76 and the tow bar is fully contracted. Linchpin 70 is in hole 74 and prevents extension of the tow bar. In FIG. 13, the linchpin has been located in hole 72 and the tow bar has been extended for the length of the slot 68.

With the above arrangement the tractor is maneuvered to place the free ends of fork 38 on the ground and at the edge of the stack. The tractor then moves forward to extend the tow bar as the trailer remains stationary. Next, the tractor is backed rapidly to cause the hammer ring 66 to strike the anvil ring 76 and drive the fork 38 by impact under the stack. This action is repeated as often as necessary for full insertion. The arrangement is particularly useful when the ground is wet and offers poor traction.

After a layer of bales has been transferred onto the transfer bed 28 from the load bed and the transfer bed 28 has been pivoted counterclockwise, as viewed in FIG. 16, the bales positioned on transfer bed 28 may be ejected therefrom at a predetermined rate upon actuation of the unloading fence 77 which is constructed for lateral movement from one side of the transfer bed 28 to the other side. It will be understood that if the material contained within the bales is to be unloaded in the loose form, the wires or strings binding such material together in bale form will first be cut or severed and removed.

The apparatus is illustrated in greater detail in FIGS. 4 to 7, where it will be seen that the elongate frame 18 has a generally horizontal longitudinal axis and is provided at its forward end with superstructure 78 to support various working elements. An electrical power center at 80 receives power from a tractor control panel shown in FIG. 15 through electrical conductors and receives appropriate signals from the control panel and limit switches located throughout the stacking apparatus. The electrical power center 80 sends power to the various solenoid operated hydraulic valves located at the hydraulic power center 82. The hydraulic power center receives its hydraulic power supply thru hydraulic lines (not shown) from the tractor's auxiliary hydraulic system or, if such an auxiliary system is unavailable, from a hydraulic pump driven by the tractor's power take off. Details of these devices are not shown as they are in the realm of engineering design.

The receiving frame 39 is pivotally supported at its rear extremity on the superstructure 78 and is supported at its forward extremity by a roller 83 which is mounted on the tow bar 22. Thus, tow bar 22 and the frame 39 will always be parallel and the leading edge of the frame 39 will always remain slightly to the rear and below baler chute 16. In this way, the frame 39 will always be in position to receive a bale as the bale chute rises or falls with respect to the stacking apparatus as rough terrain is traversed. Roller track 85 is attached to the leading edge of frame 39 to provide a flat surface for the roller 83 to run on. The leading edge of the frame 39 and the roller track 85 are curved to clear the baler chute 16 during turns in the field. The receiving frame 39 receives the bales directly from baler chute 16. The frame is an open frame to allow broken bales to fall to the ground.

When a turn is being made in the field, such as at a corner of the field, a bale discharged from chute 16 will be deposited on the receiving frame 39 at an off-center position and at an angle to the apparatus' longitudinal center line. When the bale is deposited on the receiving frame 39, sweep arms 44, pivotally mounted on supports 116, swing in toward the receiving table 40 to engage the bale and place it on the receiver table.

Receiving table 40 is mounted on an elevator 42 including parallelogram links 84 and 86. Links 84 are pivotally connected at 88 to the table support 90 and at 92 to the superstructure. A bell crank arm 94 extends laterally from their pivot shank and is pivotally connected at 96 to servomotor 98, which is pivotally mounted at 100. Link 86 is pivotally connected to the table support 90 at 102 and to the frame at 104. Extension of servomotor 98 causes the table to rise above the level of positioning bed 24 and pass through opening 26.

Guides 101, 103 and 105 are positioned to insure that the bale will be centered directly into opening 26 as the bale is raised. As the bale raises thru opening 26 it contacts keeper arms 107 (see FIG. 6) and raises the arms 107 as it passes upward. When the bale passes by the arms 107, the arms fall back to their original position, with the lateral portion of the arms extending even with the upper surface of the positioning bed 24. The keeper arms 107 will support a longitudinally oriented bale at the upper surface of bed 24 when the elevator 42 starts to return to its lower position.

As best seen in FIGS. 6 and 7 table 40 is mounted for rotation about a vertical axis on table support 90 by means of a central pivot shaft 106 mounted in boss 108 of the table support. The lower end of shaft 106 carries a lateral arm 110 adapted to be rotated through ninety degrees by servomotor 112 mounted on support 90. A spring 114, also on support 90, returns the arm to retracted position. Controlled rotation of the table makes it possible to align each bale laterally or longitudinally in accordance with the pattern to be formed.

When a bale is properly oriented on table 40 at the upper level it is ready to be bodily displaced. Fence 46, as best seen in FIGS. 4, 6 and 7, is provided at its aft end and near its forward end with depending brackets 118 which fit in slots in bed 24 and are secured to a pair of drive chains 120 extending laterally along the fore and aft edges of the bed. The chains are connected to sprockets 122, FIG. 7, mounted on cross shafts 124, and one pair of the sprockets is driven by motor 126. Upon the proper signal, fence 46 moves laterally until it contacts the bale and then pushes it to its predetermined lateral position.

Fence 48 is fixed to a carriage 128 which embraces fence 46 for longitudinal movement thereon. If desired, fence 46 may have track grooves for the reception of carrier wheels, not shown, within the carriage to facilitate movement. The extreme forward end 130 of fence 46 carries a vertical pivot shaft 132, to which are pivotally connected the inner ends of a first pair of toggle links 134. These links are pivotally connected at their outer ends by pivots 136 to a second pair of toggle links 138 which in turn are pivotally connected at 140 to fence 48. Servomotor 142 is also mounted on pivot shaft 132. When it is extended, the head 144 of its piston rod moves rearwardly. Cable 146 is connected to links 134 at 148 and is also fixed to head 144 so that it serves as a pair of tension links to pull links 134 rearwardly. The geometry is such that extension of the servomotor a short distance moves links 134 through a large angle. They produce a corresponding motion of links 138 to move fence 48 to the rear edge of bed 24. Springs 150, connected to the pivot shaft 132 and fence 48, retract the fence and the servomotor. Fence 48 is dimensioned to extend at least one bale length to each side of fence 46 in order to engage properly a bale in any position and push it entirely onto transfer bed 28.

As previously indicated, in order to minimize the amount of time required to locate the positioning fence 46, the positioning fence 46 is moved to a predetermined location either to the right or left of the opening 26 at the same time the elevator is being lowered to receive a new bale or is being raised to elevate a new bale so received.

Carriage 32 is mounted for longitudinal movement on a pair of tracks 152. These tracks are square tubing having slots 154 in their upper walls to receive the carriage, which is provided with wheels 156 to reduce friction. The carriage is normally held against rearward movement by latch means 158 pivoted to the carriage at 160 and provided with a detent tab 162 to engage the forward end of the track. A hairpin spring 164 on the carriage urges arm 158 toward latching position.

Transfer bed 28 is swung upward about pivot 30 by servomotor 166 pivoted to the frame at 168 and to the bed at 170. It is set at such an inclination that further extension serves to move the transfer bed bodily rearward toward the load bed. A release link 172 is pivoted at 174 to a bracket 176 secured to bed 28. At its lower end the link carries a roller 178 mounted on a cross shaft 180 and adapted to roll along a guide 182. When the bed 28 is raised, the roller follows up the guide and cross shaft 180 enters notch 184 in the detent tab 162.

This engagement raises the latch and releases the carriage just as bed 28 reaches vertical position. The upward movement of latch arm 158 is limited by a stop 186 fixed on the carriage and is so located that roller 178 will roll on the upper surface of track 152 with cross shaft 180 engaged in notch 184. Thus link 172 cannot move up, down, forward, or rearward with respect to carriage 32 and it serves as a brace or strut to maintain the transfer bed in upright attitude during its bodily movement. When the servomotor is contracted, the bed moves to its foremost position and roller 178 drops off the forward end of the track, allowing the latch to again engage the track. It will be seen that the interlock means prevents bodily movement of the transfer bed during the tilting operation and prevents tilting movement of the transfer bed during the horizontal movement operation.

When the transfer bed moves rearwardly to its full extent it carries the first layer within support frame 50 and against fork 38. Guide plates 188 on the upright clamp bars 52 will engage any marginal bales which have been displaced and guide them through the opening. The support frame contracting means 54 includes a telescoping tube 190 and rod 192 connected to the upper ends of clamp bars 52 which are pivotally mounted at their lower ends on brackets 204. A servomotor 194 within tube 190 is connected to rod 192 at one end and to the tube 190 at the other end to permit a contraction of means 54, pulling bars 52 toward each other to compact the layer and prevent it from toppling when the transfer bed is withdrawn.

As successive layers are delivered to the load bed the fork 38 moves rearward and the new layer shoves the previously loaded layers to the rear until the entire load bed is filled. Each tine of the fork is carried by an elongate track 196 and its movement is controlled by a drive chain 198 trained over forward sprockets 200 carried on a common shaft 202. The chains in turn are actuated by servomotor 206. The load bed is pivotally mounted at 208 on brackets 210 for tilting to vertical position for unloading and loading and is actuated by servomotor 212, shown in phantom, connected at 214 to the frame and at 216 to the load bed. When the load bed is in vertical position, motor 206 may be actuated to raise the fork to truck height so that a butt may be loaded directly on a truck without need for any other machinery.

Referring now to FIGS. 4, 6 and 7 and particularly to FIG. 2, it will be noted that an anchor member 217 having a plurality of extending members 217A and 217B is mounted within the grooves 38A formed in fork 38 for translating movement therealong and also for pivotal movement relative thereto. With the load bed 36 disposed in a horizontal position as shown in FIGS. 4, 6 and 7, the anchor member 217 is inclined upwardly relative to the load bed 36. However, as shown in phantom in FIG. 2, due to the weight of the bales and the rotation of the load bed 36 to the position shown in phantom in FIG. 2, upon lowering the fork 38 the anchor member 217 is disposed parallel with respect to the load bed 36. Lowering of the fork 38 results in the extending members 217A and 217B being driven into the ground. The anchor member 217, thus, secures the stack of bales relative to the ground. Withdrawal of the fork 38 from beneath the stack of bales without adversely disturbing same is accomplished by moving the trailer 10 forwardly, as viewed in FIG. 2, until the free end of the fork 38 is disposed adjacent the anchor member 217, it being kept in mind that the anchor member 217 is pivotally mounted to guide member 221 which is constructed for translatory movement within the grooves 38A of the fork 38. With the free ends of the fork 38 positioned as aforesaid, the fork 38 is then elevated until the extending members 217A and 217B are removed from the ground. Thereafter, the load bed is rotated in a counterclockwise direction, as viewed in FIG. 2, until same once again is disposed in a horizontal position. It will be readily appreciated, however, that the anchor member 217 effectively anchors the stack of bales in one position relative to the ground while the fork 38 is being removed from beneath said stack. It will be noted that a counterweight 219 is preferably mounted on the frame near the forward portion thereof to stabilize the apparatus during the unloading of a stack of bales.

FIGS. 8–11 show layer patterns which can be produced by the use of the present apparatus. FIGS. 8–11 show four cooperating patterns for field use. The use of these four patterns in any sequence will eliminate the existence of a common seam extending vertically throughout the four layers. This is important in the formation of a stable stack of bales. It will be understood that a stack of bales of increased height can be obtained through the use of subsequent layers of bales with the same varying plan forms of layers.

Figure 14:
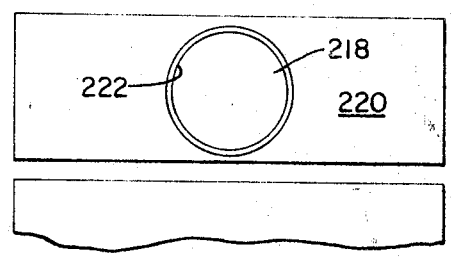
FIG. 14 is a schematic plan view of a modified form of the positioning bed and receiving table.

FIG. 14 illustrates a modification in which the bale receiving table 218 is circular and the positioning bed 220 is provided with a circular opening 222 to receive it. The diameter of table 218 is great enough to accommodate the length of a bale. Therefore the operation can be speeded up by rotating the table while it is being elevated rather than waiting until it has reached the upper level.

While the apparatus is intended primarily for use with a baler having a central, low level, discharge chute, it can be readily used with any other machine. A baler with high or side delivery can deliver bales directly to the center of the positioning bed, and the receiving table will then remain at the upper level at all times and perform its orienting function in the same way. Similarly it can be used with gathering machines which will pick up bales directly from the ground and feed them laterally or longitudinally to the receiving table at the lower or upper level.

Figure 15:
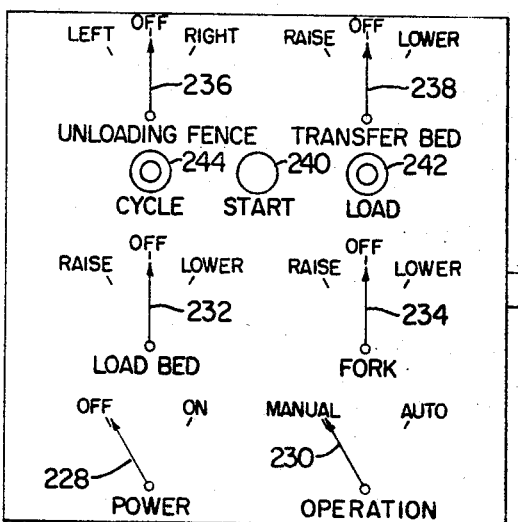
FIG. 15 is a schematic view of a suitable control console.

A schematic illustration of a control console for operating the apparatus is shown in FIG. 15. Console 224, mounted on the tractor, is supplied with power from a suitable source on the tractor by cable 226 and is provided with a two position power switch 228 and a two position operation switch 230. The operation switch 230 is used to effect manual or automatic operation of the apparatus. Console 224 also includes a three position load bed switch 232, a three position fork switch 234, a three position fence switch 236 and a three position transfer bed switch 238. The console 224 also includes a start switch or button 240, a signal light 242 indicating the apparatus has a full load thereon, and a signal light 244 indicating the apparatus is ready to start the formation of a new stack of bales. The use of the apparatus is effected by switching the power switch 228 to the "on" condition, setting the operation switch 230 to the automatic position, and then depressing the start button 240. When the signal light 244 illuminates, this is an indication that the apparatus is ready to start collecting bales to form a new stack. When the stack has been completed, the signal light 242 becomes illuminated. When the stack of bales has been completed as represented by the illumination of the signal light 242, the load bed switch 232 is moved to the "raise" position. Following this, the fork switch 234 is moved to the "lower" position thereby resulting in the stack being positioned upon the ground. The apparatus and tractor are then moved forward until the free ends of the fork 38 are positioned adjacent the anchor member 217. The apparatus and trailer are then stopped, the fork switch 234 is moved to the "raise" position, and then the load bed switch 232 is moved to the "lower" position thereby returning the load bed to the horizontal position ready for receiving a new stack of bales. Following this, the start button 240 is actuated again and the whole cycle is repeated. The unloading fence switch 236 and the transfer bed switch 238 are used when the operation switch 230 is positioned in the manual mode. The console 224 is connected to the electrical power center 80 on the apparatus by cable 246.

It will be apparent to those skilled in the art that various changes may be made in the construction and operation of the apparatus as disclosed without departing from the spirit of the invention.

I claim:

1. Apparatus for stacking bales in preselected patterns, comprising: a frame having a longitudinal fore and aft axis and adapted to be positioned with its forward end adjacent to a bale delivery device; a positioning bed on said frame located at an upper level adjacent said forward end; said bed having a laterally extending rear edge; a transfer bed of generally rectangular planform on said frame located approximately at said upper level rearwardly of and adjacent to said positioning bed; a receiving table on said frame along the longitudinal axis thereof and adapted to receive a bale from said bale delivery device; an elevator on said frame supporting said receiving table and movable vertically to position said table at a first, lower level to receive a bale, and to raise it to a second, upper level approximately the same as that of the positioning bed; a first, laterally movable, positioning fence and a second, longitudinally movable, loading fence arranged above said positioning bed; said first fence being adapted to engage a bale on said receiving table and move it laterally to a predetermined position on the positioning bed; and said second fence being adapted to engage a bale and move it from the positioning bed to the transfer bed.

2. Apparatus as claimed in claim 1; said positioning bed having a central opening extending vertically therethrough; said receiving table being directly below said opening at its first level and being arranged to rise through said opening to its second level.

3. Apparatus as claimed in claim 1; said receiving table being provided with means to rotate it approximately ninety degrees about a central vertical axis to change the orientation of the bale with respect to the positioning table.

4. Apparatus as claimed in claim 1; and a pair of sweep arms on said frame below the positioning bed, one located to each side of the longitudinal axis of said frame; said sweep arms being movable simultaneously toward the longitudinal axis to engage a bale on said table between them and align it with the longitudinal axis.

5. Apparatus as claimed in claim 1; said first fence extending fore and aft and being mounted at its ends on the positioning bed for lateral movement.

6. Apparatus as claimed in claim 5; said second fence extending laterally and being mounted at a position intermediate its ends on said first fence for movement fore and aft with respect to the first fence and for bodily movement laterally with the first fence.

7. Apparatus for building a plurality of elongate bales into a single layer of generally rectangular planform with the axes of the bales oriented to each other in a horizontal plane in accordance with a predetermined pattern, comprising: a frame having a horizontal longitudinal axis; a positioning bed mounted on said frame in a horizontal position and having a lateral edge; said positioning bed being generally rectangular in planform and having a longitudinal axis perpendicular to the axis of the frame; a transfer bed of generally rectangular planform mounted on said frame in a horizontal position axially of the frame adjacent to the positioning bed and having a laterally extending edge parallel to and coextensive with the confronting lateral edge of the positioning bed; and a receiving table adapted to be located at the center of the positioning bed and mounted for rotation about a vertical axis; said table being adapted to receive successive bales whose axes extend axially or laterally of the axis of the frame; controllable means to rotate selectively the table about its axis on occasion to orient each bale axially or laterally in accordance with a predetermined plan; first pusher means to move on occasion each bale bodily from the receiving table laterally of the frame axis and to either side thereof to a predetermined position on the positioning bed; and second pusher means to move bodily each bale axially of the frame to transfer the bale located on either the receiving table or on the positioning bed to the transfer bed.

References Cited

UNITED STATES PATENTS

| | | |
|---|---|---|
| 2,530,341 | 11/1950 | Satsky. |
| 2,709,014 | 5/1955 | Soles _____ 214—518 |
| 2,870,922 | 1/1959 | Thomson. |
| 3,085,696 | 4/1963 | Stainforth et al. |
| 3,164,080 | 1/1965 | Miller. |
| 3,385,456 | 5/1968 | Snider. |
| 3,395,814 | 8/1968 | Grey. |
| 3,406,840 | 10/1968 | Soteropulos. |

GERALD M. FORLENZA, Primary Examiner

R. J. SPAR, Assistant Examiner

U.S. Cl. X.R.

214—518, 8.5, 353, 508